US010556658B1

(12) United States Patent
Frost et al.

(10) Patent No.: US 10,556,658 B1
(45) Date of Patent: Feb. 11, 2020

(54) MARINE DRIVES AND IDLE RELIEF MUFFLERS FOR MARINE DRIVES

(71) Applicant: Brunswick Corporation, Mettawa, IL (US)

(72) Inventors: Brent C. Frost, Fond du Lac, WI (US); Jeffrey Chiang, Oshkosh, WI (US); Andrew S. Waisanen, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 21 days.

(21) Appl. No.: 15/864,131

(22) Filed: Jan. 8, 2018

(51) Int. Cl.
*B63H 20/24* (2006.01)
*F01N 1/08* (2006.01)
*F01N 13/00* (2010.01)

(52) U.S. Cl.
CPC ........... *B63H 20/245* (2013.01); *F01N 1/083* (2013.01); *F01N 13/004* (2013.01)

(58) Field of Classification Search
CPC ...... F01N 2590/021; F01N 3/00; F01N 3/005; F01N 13/004; B63H 20/24; B63H 20/245
See application file for complete search history.

(56) References Cited

U.S. PATENT DOCUMENTS

| 4,668,199 | A | | 5/1987 | Freund et al. |
| 4,952,182 | A | | 8/1990 | Curtis et al. |
| 6,027,385 | A | * | 2/2000 | Katayama ............ B63H 20/245 440/88 L |
| 6,409,557 | B1 | * | 6/2002 | Tsunekawa .......... B63H 20/245 440/88 R |
| 8,876,566 | B1 | | 11/2014 | Hilbert et al. |
| 8,998,663 | B1 | | 4/2015 | Bonde et al. |
| 9,376,195 | B1 | | 6/2016 | Jaszewski et al. |
| 2009/0269999 | A1 | * | 10/2009 | Schaub .................. B63H 21/32 440/89 J |

* cited by examiner

*Primary Examiner* — Andrew Polay
(74) *Attorney, Agent, or Firm* — Andrus Intellectual Property Law, LLP

(57) ABSTRACT

A marine drive includes an engine; an exhaust conduit that conveys exhaust gases from the engine to an idle relief outlet on the marine drive, wherein the idle relief outlet discharges the exhaust gases to atmosphere when the marine drive is operated at an idle speed; and an idle relief muffler having a muffler inlet that receives the exhaust gases from the exhaust conduit, a muffler outlet that discharges the exhaust gases to the idle relief exhaust outlet, and a drain for draining water from the idle relief muffler. The muffler inlet conveys exhaust gases into the idle relief muffler in a direction that is oriented away from the muffler outlet and away from the drain, such that water in the exhaust gases is encouraged to separate from the exhaust gases and then drain from the idle relief muffler via the drain.

12 Claims, 6 Drawing Sheets

MARINE DRIVES AND IDLE RELIEF MUFFLERS FOR MARINE DRIVES

FIELD

The present disclosure relates to marine drives for propelling marine vessels in water, and more particularly to marine drives such as outboard motors having idle relief mufflers for discharging exhaust gases to the atmosphere when the marine drive is operated at an idle speed.

BACKGROUND

The following U.S. Patents are incorporated herein by reference:

U.S. Pat. No. 4,668,199 discloses an exhaust system for an outboard motor, which includes a main exhaust passageway extending through a partially water-filled chamber in the driveshaft housing. An inlet idle relief passage connects the top of the chamber with the main exhaust passageway and an outlet passage connects the top of the chamber with the atmosphere. The system thus defines an effective exhaust silencer for the idle exhaust.

U.S. Pat. No. 4,952,182 discloses an exhaust relief system for an outboard motor that includes an exhaust chamber into which exhaust is discharged from the engine. A first passage in communication with the exhaust chamber provides contraction of the exhaust as the exhaust passes rearwardly, from which the exhaust is discharged into an expansion chamber which substantially surrounds the exhaust chamber. From the expansion chamber, the exhaust is routed through and contracted into a second passage in communication with the expansion chamber, after which it is discharged to atmosphere. The tortuous path provided by the exhaust relief system, along with the repeated expansion and contraction of the exhaust as it flows to atmosphere, provides a muffling effect at idle operation.

U.S. Pat. No. 9,376,195 discloses an outboard motor that includes an engine having an exhaust gas discharge opening, a midsection housing coupled below and supporting the engine, and an exhaust pipe having an exhaust inlet in fluid communication with the exhaust gas discharge opening. The exhaust pipe extends downwardly to a primary exhaust outlet. An idle relief port in the exhaust pipe is located in a fluid path between the exhaust inlet and the primary exhaust outlet. A sound-attenuating plenum chamber has an interior that is in fluid communication with an interior of the exhaust pipe by way of the idle relief port. The plenum chamber is a separate component that is exterior to the midsection housing, and exhaust gas flows from the interior of the exhaust pipe to the interior of the plenum chamber without first flowing through the midsection housing.

SUMMARY

This Summary introduces a selection of concepts that are further described herein below in the Detailed Description. This Summary is not intended to identify key or essential features of the claimed subject matter, nor is it intended to be used as an aid in limiting scope of the claimed subject matter.

A marine drive includes an engine; an exhaust conduit that conveys exhaust gases from the engine to an idle relief outlet on the marine drive, wherein the idle relief outlet discharges the exhaust gases to atmosphere when the marine drive is operated at an idle speed; and an idle relief muffler having a muffler inlet that receives the exhaust gases from the exhaust conduit, a muffler outlet that discharges the exhaust gases to the idle relief exhaust outlet, and a drain for draining water from the idle relief muffler. The muffler inlet conveys exhaust gases into the idle relief muffler in a direction that is oriented away from the muffler outlet and away from the drain, such that water in the exhaust gases is encouraged to separate from the exhaust gases and then drain from the idle relief muffler via the drain.

DETAILED DESCRIPTION OF THE DRAWINGS

Figure 1:
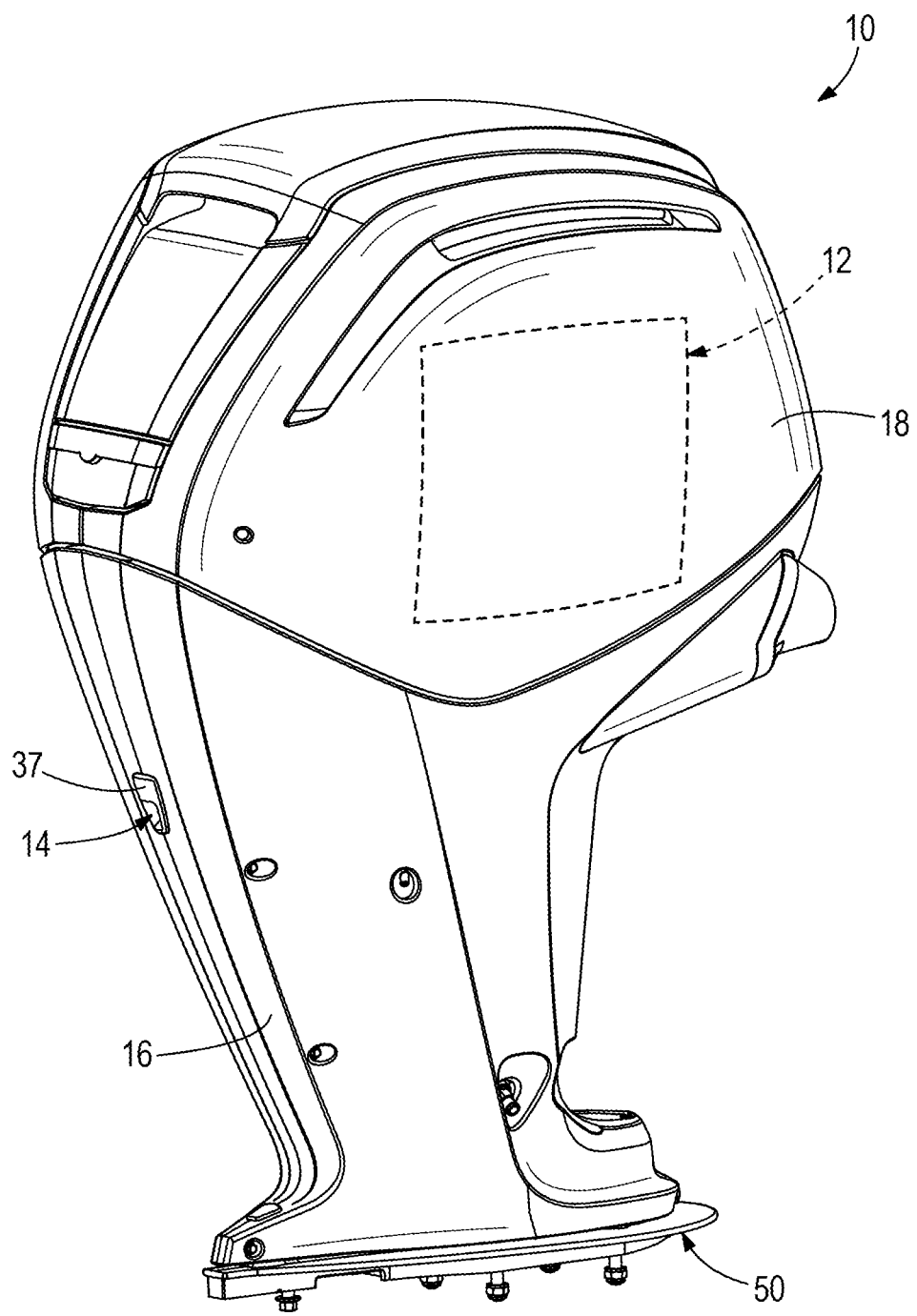
FIG. 1 is a perspective view taken from U.S. Pat. No. 9,376,194 showing portions of an outboard motor having an idle relief outlet.

FIG. 1 is taken from the above-incorporated U.S. Pat. No. 9,376,194 and depicts an outboard motor 10 having an internal combustion engine 12. The outboard motor 10 also has an idle relief outlet 14 that discharges exhaust gases during operation of the engine 12 at idle speeds. Although FIG. 1 depicts an outboard motor, it should be understood that the concepts of the present disclosure are applicable to any type of marine drive having an idle relief outlet for discharging exhaust gases to the atmosphere during operation at idle speed, including for example inboard drives, stern drives, and/or the like. In the illustrated example, the idle relief outlet 14 is located in a lower cowl portion 16 of the outboard motor 10, however in other examples the idle relief outlet 14 could be located in an upper cowl portion 18 that covers the noted engine 12. The exact location of the idle relief outlet 14 can vary from what is shown, however the idle relief outlet 14 is typically located on the outboard motor 10 in a location where it remains above water when the outboard motor 10 is operated at idle and low speeds. The configuration of the outboard motor 10, including the lower cowl portion 16 and upper cowl portion 18, can also vary from what is shown.

Figure 2:
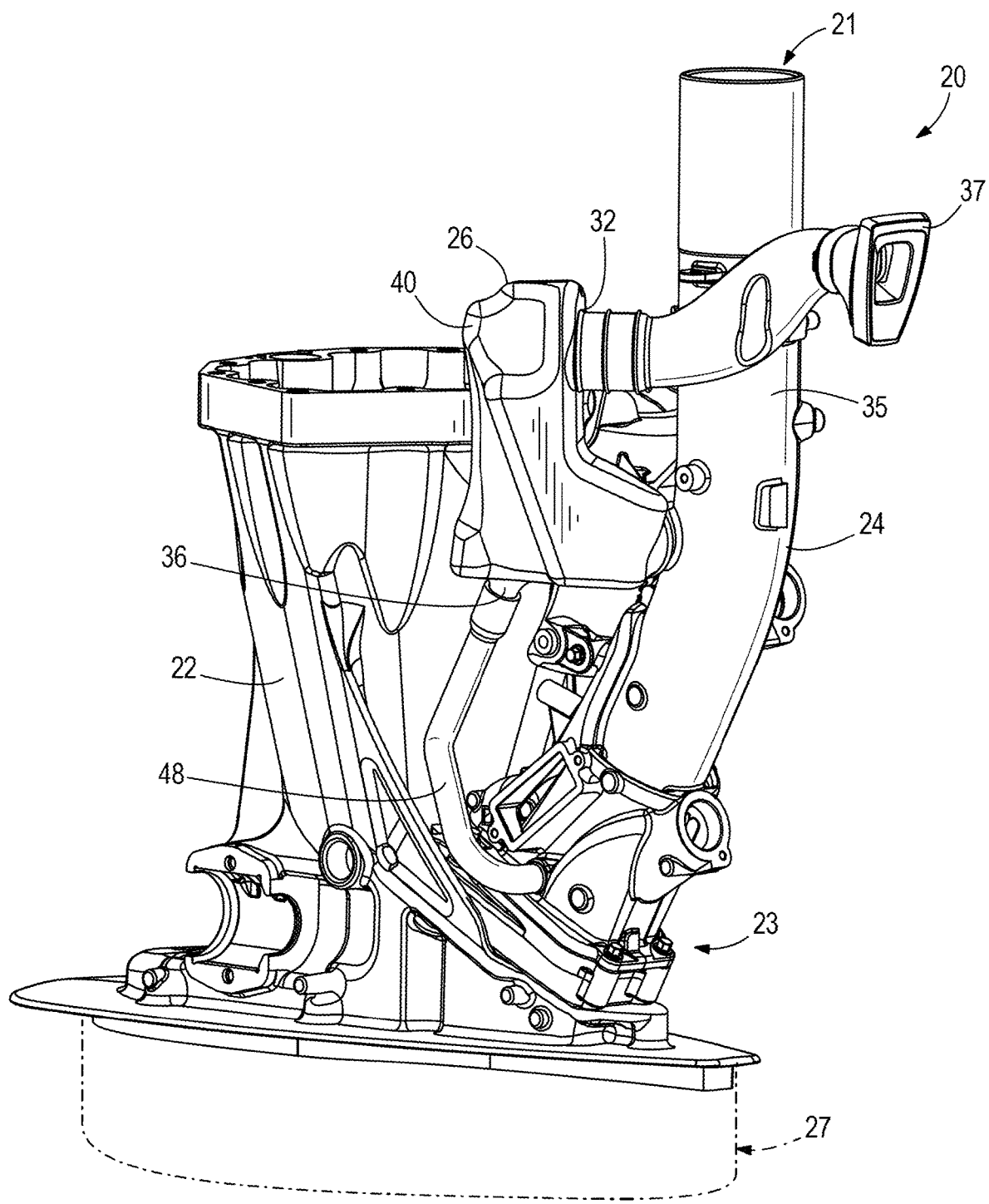
FIG. 2 is a perspective view of an exhaust system according to the present disclosure.
Figure 3:
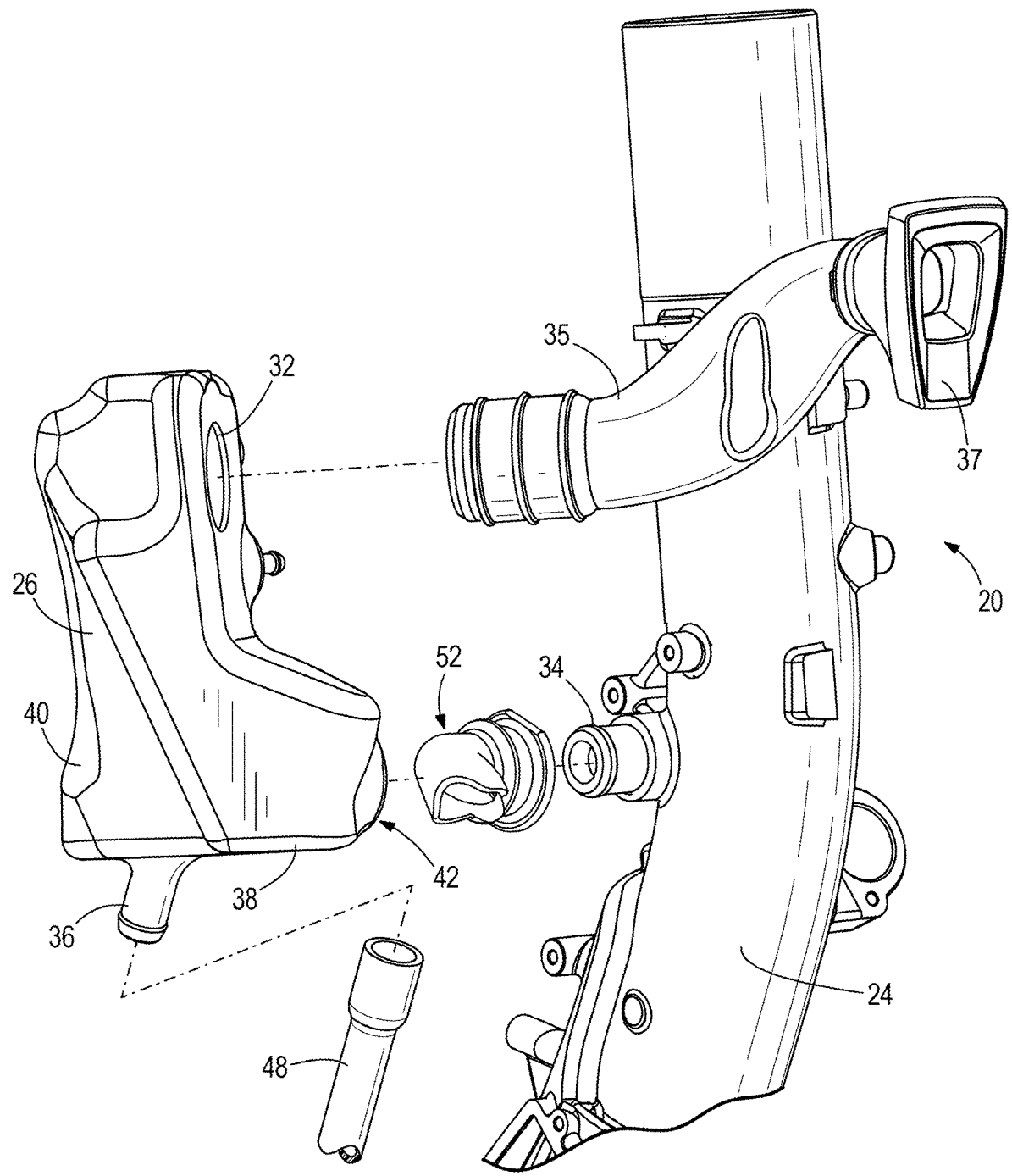
FIG. 3 is an exploded view of portions of the exhaust system shown in FIG. 2.

FIGS. 2 and 3 depict an exhaust system 20 for the outboard motor 10. The exhaust system 20 is configured to convey exhaust gases away from the engine 12, including primarily for discharge to the body of water in which the outboard motor 10 is operating, and alternately or concurrently for discharge to the surrounding atmosphere. FIG. 2 also depicts a driveshaft housing 22, which for example can enclose a generally vertically extending driveshaft and/or other conventional outboard motor components, such as an oil sump, etc. The exhaust system 20 and driveshaft housing 22 are enclosed by the lower cowl portion 16 shown in FIG. 1.

The exhaust system 20 includes a generally vertically extending exhaust conduit 24 having an upper end 21 coupled to an exhaust manifold of the engine 12 shown in FIG. 1 and a lower end 23 coupled to the noted driveshaft housing 22. A lower gearcase 27 is schematically depicted below the driveshaft housing 22 and includes, for example, a conventional propeller assembly for the outboard motor 10. During operation of the outboard motor 10 at above-idle speeds, a majority of the exhaust gases from the engine 12 is conveyed downwardly through the exhaust conduit 24 and into the surrounding body of water via passages in the lower end of the driveshaft housing 22, the gearcase 27, and the noted propeller assembly, all as is conventional.

Referring to FIGS. 2-5, the exhaust system 20 also has an idle relief circuit that conveys a portion of the exhaust gases to the surrounding atmosphere via the idle relief outlet 14, particularly when the outboard motor 10 is operated at an idle speed. See the above-incorporated U.S. Pat. No. 9,376,195 for further disclosure regarding idle relief circuits and idle relief of exhaust gases from an outboard motor. Similar to the examples shown in U.S. Pat. No. 9,376,195, the idle relief circuit has an idle relief muffler 26 which is configured to muffle and/or silence noises emanating from the exhaust system 20. In the illustrated example, the idle relief muffler 26 has an open interior 54 that facilitates expansion of the exhaust gases conveyed thereto, thus reducing noise, all as is conventional. See for example the above-incorporated U.S. Pat. Nos. 4,952,182 and 9,376,195. The idle relief muffler 26 has a muffler inlet 28 that receives the exhaust gases from a bypass conduit 34, which is located between the upper and lower ends 21, 23 of the exhaust conduit 24. The idle relief muffler 26 also has a muffler outlet 32 that discharges the exhaust gases to the idle relief outlet 14 via for example an idle relief conduit 35 and an idle relief grommet 37, which is further described in the above-incorporated U.S. Pat. No. 9,376,195. The idle relief muffler 26 also includes a drain 36 that drains water from the idle relief muffler 26 to a drain line 48 for discharge to the surrounding body of water, all as will be described further herein below.

Through research and experimentation, the present inventors have realized that the exhaust gases conveyed via the exhaust conduit 24 typically contain water, which impacts the walls of the idle relief muffler 26 at a significant velocity. Upon hitting the walls, the water tends to migrate up the idle relief muffler 26 until it exits the muffler outlet 32, idle relief conduit 35, and idle relief outlet 14, via the idle relief grommet 37. Discharge of water via the idle relief outlet 14 can be visually unappealing, as well as cause poor exhaust sound quality and/or staining and/or salt or other solid deposits to build-up on the lower cowl 16.

Referring to FIGS. 2-5, the interior 54 of the idle relief muffler 26 has sidewalls 40 that vertically extend with respect to a vertical axis V and a base wall 38 that horizontally extends with respect to a horizontal axis H that is perpendicular to the vertical axis V, and also laterally extends with respect to a lateral axis L that is perpendicular to the vertical axis V and perpendicular to the horizontal axis H. The base wall 38 and sidewalls 40 are generally transverse to each other such that a lower corner 42 is defined by the base wall 38 and the sidewalls 40. The base wall 38 is sloped downwardly with respect to the horizontal axis H such that water that condenses or otherwise separates from the exhaust gases drains under force of gravity down to the drain 36, as shown at arrow W. The muffler inlet 28 is formed in one of the sidewalls 40 at a location that is vertically higher than the drain 36. The muffler inlet 28 is configured to convey exhaust gases to the interior 54 of the idle relief muffler 26. The muffler outlet 32 is located vertically higher than the muffler inlet 28. The muffler outlet 32 is configured to discharge the exhaust gases from the interior 54 of the idle relief muffler 26 to the idle relief conduit 35, and ultimately for discharge to the atmosphere via the idle relief grommet 37 on the idle relief outlet 14.

According to the present disclosure, the muffler inlet 28 has an inlet grommet 52 that extends through one of the sidewalls 40 and projects into the interior 54 of the idle relief muffler 26. The inlet grommet 52 is specially configured to redirect the axial flow of exhaust gases from the bypass conduit 34 into the direction shown at arrow D, which specifically is oriented away from the muffler outlet 32 and away from the drain 36. This advantageously allows the water in the exhaust gases to efficiently separate from (e.g., condense out of) the flow of exhaust gases and then drain by gravity to the drain 36, as opposed to being carried with the exhaust gases through the idle relief outlet 14 or otherwise travel up the sidewalls 40 to the muffler outlet 32, as described above. The inlet grommet 52 extends into the interior 54 of the idle relief muffler 26 and is connected to the bypass conduit 34 such that the portion of the exhaust gases carried by the bypass conduit 34 are redirected into the interior 54 of the idle relief muffler 26 in a direction that causes the exhaust gases to impinge upon either the sidewalls 40 or base wall 38, or both, thus facilitating separation of water from the flow of exhaust gases. In the illustrated example, the inlet grommet 52 directs the exhaust gases downwardly into the interior 54 of the idle relief muffler 26, and transversely to the vertical direction V, as opposed to in the direction of the drain 36 and as opposed to in the direction of the muffler outlet 32. Even more specifically, the muffler inlet 28, via the inlet grommet 52, redirects the exhaust gases towards the lower corner 42, which is at a location that is opposite the location of the drain 36 with respect to the horizontal direction H.

Referring to FIGS. 4 and 6A-6C, the inlet grommet 52 has a hood 58 disposed in the interior 54 of the idle relief muffler 26. The hood 58 defines the deflector surface, which is generally curved to reorient the exhaust flow from an axial flow to a ninety-degree transverse flow. The inlet grommet 52 has an inlet end 60 and an outlet end 62. A bore 64 through the inlet grommet 52 conveys the exhaust gases from the inlet end 60 to the outlet end 62. A flat 66 on the outer perimeter of the inlet end 60 provides a manual indexing feature, which engages with an outer surface of the sidewall 40 of the idle relief muffler 26, thereby facilitating proper orientation of the hood 58 inside the interior 54 of the idle relief muffler 26, so that the exhaust gases are properly redirected towards the corner 42 in the direction D.

Figure 4:
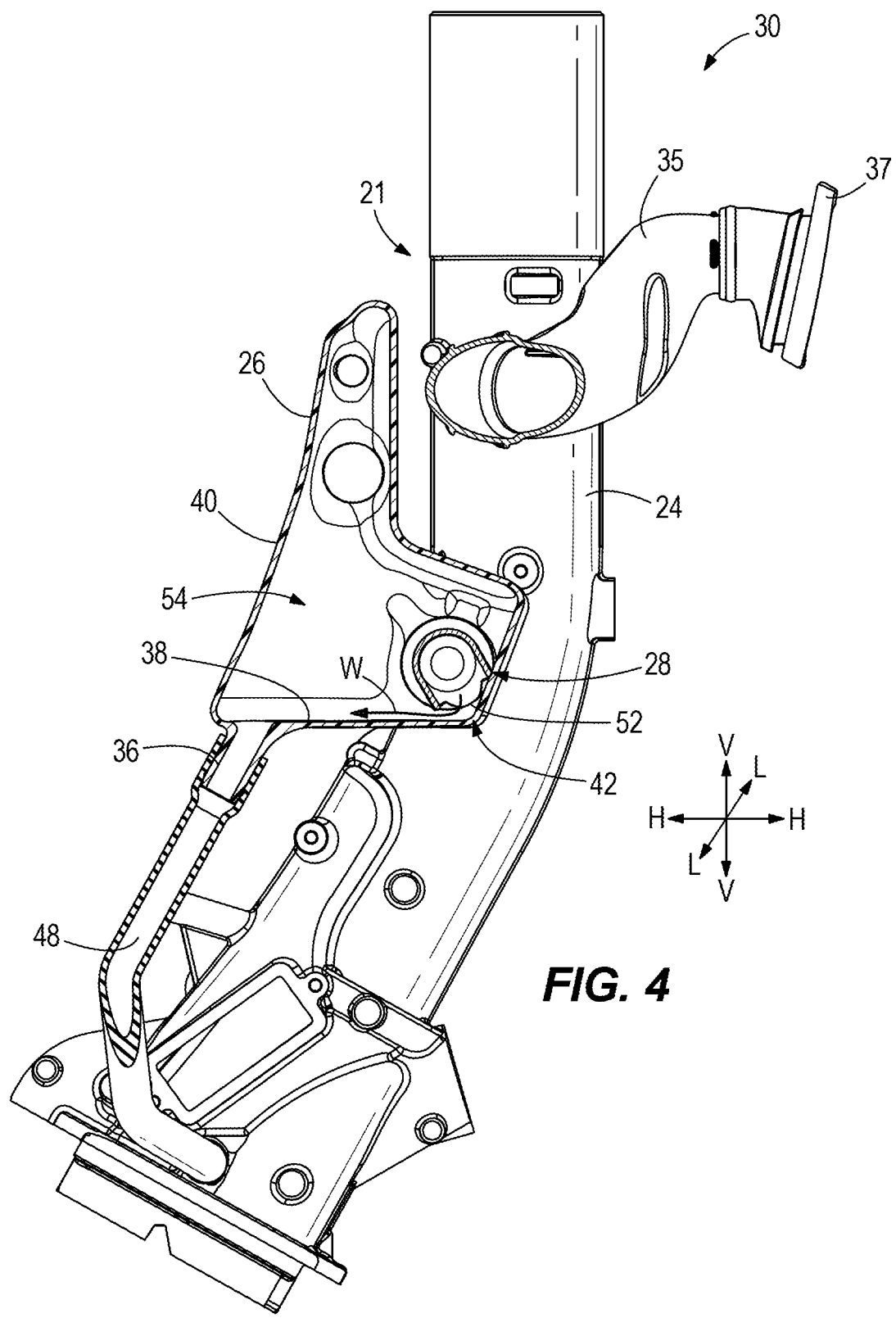
FIG. 4 is a vertical sectional view of an idle relief muffler according to the present disclosure.
Figure 5:
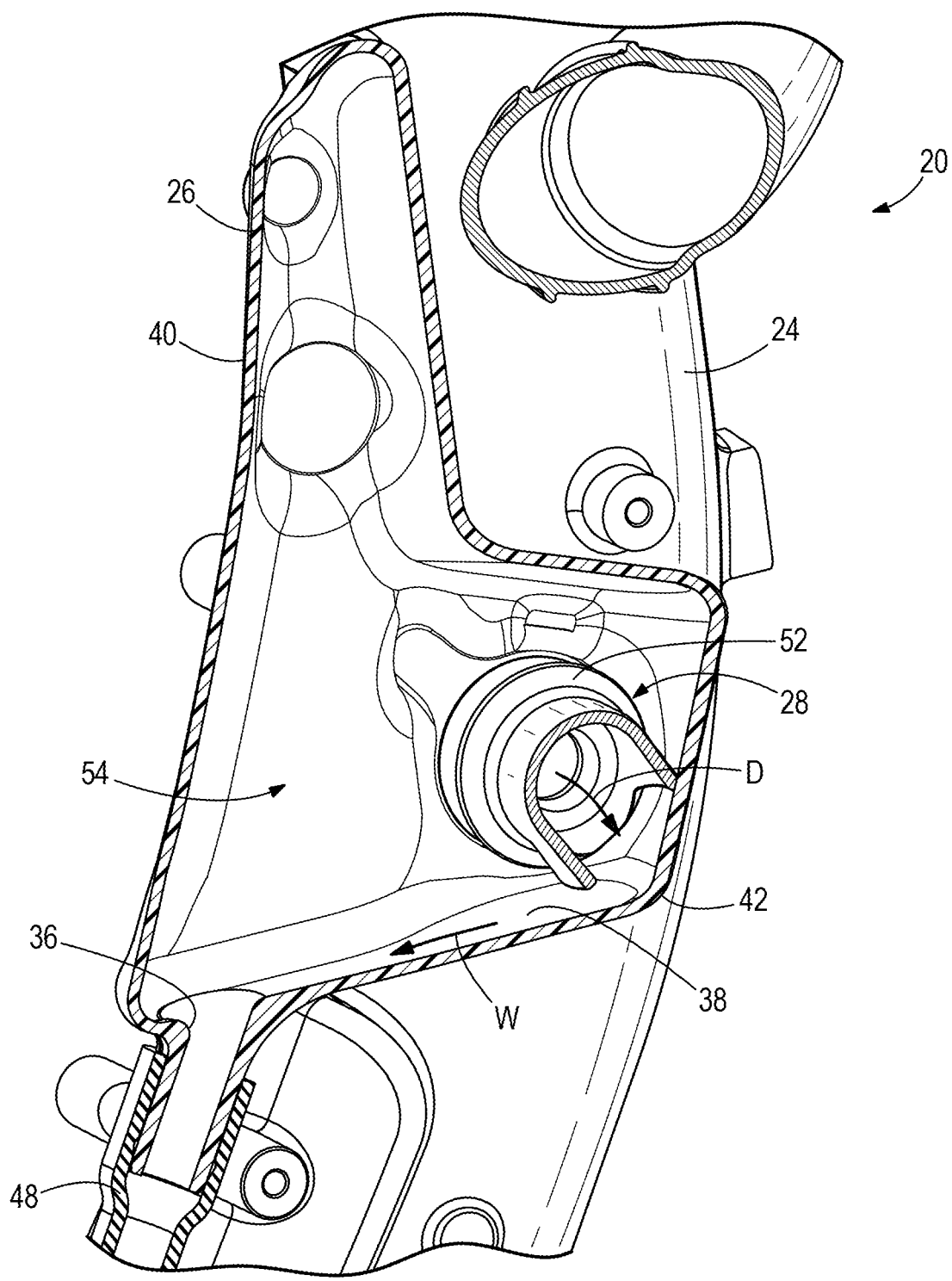
FIG. 5 is another sectional view of the idle relief muffler.
Figure 6A:
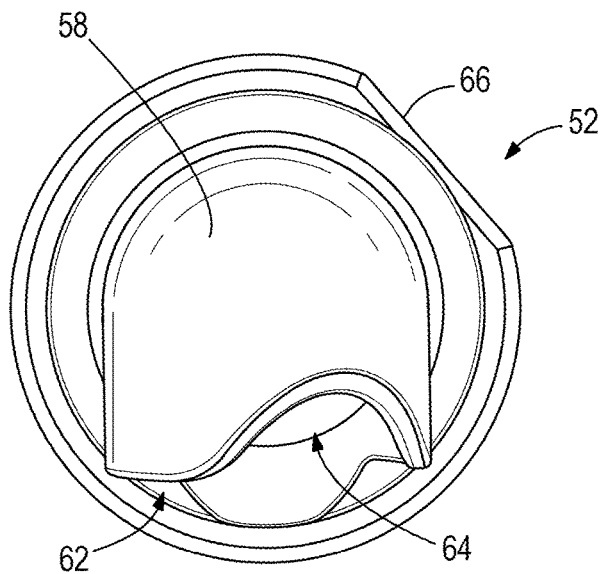
FIGS. 6A-6C are isometric views of an inlet grommet according to the present disclosure.
Figure 6B:
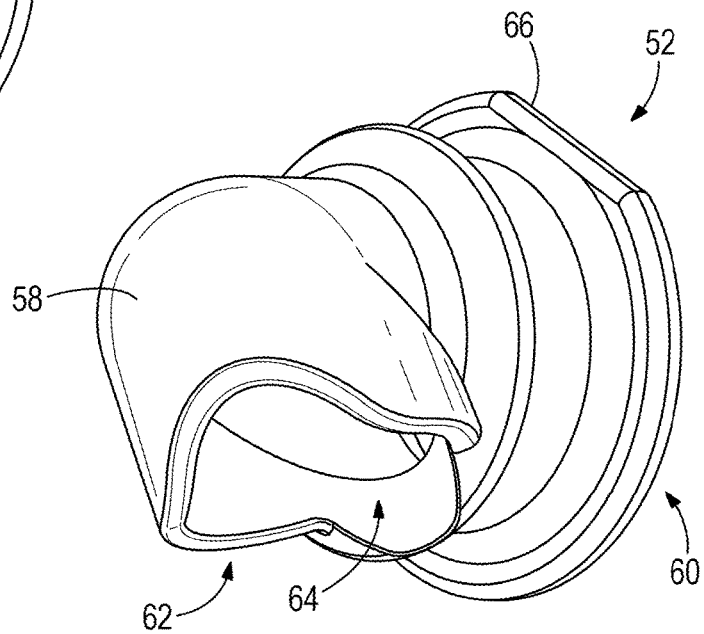
Figure 6C:
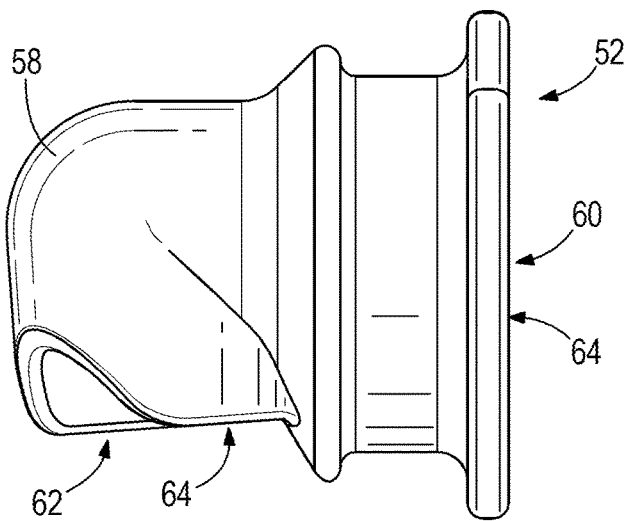

Referring to FIG. 4, drain 36 is spaced apart from the lower corner 42 to which the muffler inlet 28 is oriented. In this manner, water that is in the exhaust gases is encouraged to separate from the exhaust gases and drain by gravity to the drain 36 via the base wall 38, as described herein above, rather than migrate up the sidewalls 40 towards the muffler outlet 32. The drain 36 is connected to the drain conduit 48, which extends downwardly to the lower portion of the drive shaft housing 22, via the exhaust conduit 20, for drainage of water from the outboard motor 10 via a drainage port under the splash plate 50 on the outboard motor 10, see FIG. 1.

In the present description, certain terms have been used for brevity, clearness and understanding. No unnecessary limitations are to be implied therefrom beyond the requirement of the prior art because such terms are used for descriptive purposes only and are intended to be broadly construed. The different systems, methods and apparatuses described herein may be used alone or in combination with other systems, methods and apparatuses. Various equivalents, alternatives and modifications are possible within the scope of the appended claims.

What is claimed is:

1. A marine drive comprising:
an engine;
an exhaust conduit that conveys exhaust gases from the engine to an idle relief outlet on the marine drive, wherein the idle relief outlet discharges the exhaust gases to atmosphere when the marine drive is operated at an idle speed; and
an idle relief muffler having a muffler inlet that receives the exhaust gases from the exhaust conduit, a muffler outlet that discharges the exhaust gases to the idle relief exhaust outlet, and a drain for draining water from the idle relief muffler,
wherein the muffler inlet conveys exhaust gases into the idle relief muffler in a direction that is oriented away from the muffler outlet and away from the drain, such that water in the exhaust gases is encouraged to separate from the exhaust gases and then drain from the idle relief muffler via the drain;
wherein the muffler inlet has an inlet grommet that extends into an interior of the idle relief muffler, the inlet grommet having a deflector surface configured to redirect the exhaust gases from the exhaust conduit in the direction that is oriented away from the muffler outlet and away from the drain;
wherein the idle relief muffler comprises a base wall and sidewalls that extend upwardly from the base wall, wherein the base wall and sidewalls are transverse to each other such that a corner is defined between the base wall and sidewalls, and wherein the inlet grommet extends through one of the sidewalls; and
wherein the deflector surface redirects the exhaust gases towards the corner.

2. The marine drive according to claim 1, wherein the inlet grommet has a hood and wherein the deflector surface is part of the hood.

3. A marine drive comprising:
an engine;
an exhaust conduit that conveys exhaust gases from the engine to an idle relief outlet on the marine drive, wherein the idle relief outlet discharges the exhaust gases to atmosphere when the marine drive is operated at an idle speed; and
an idle relief muffler having a muffler inlet that receives the exhaust gases from the exhaust conduit, a muffler outlet that discharges the exhaust gases to the idle relief exhaust outlet, and a drain for draining water from the idle relief muffler,
wherein the muffler inlet conveys exhaust gases into the idle relief muffler in a direction that is oriented away from the muffler outlet and away from the drain, such that water in the exhaust gases is encouraged to separate from the exhaust gases and then drain from the idle relief muffler via the drain;
wherein the idle relief muffler has an interior that is defined by sidewalls that extend with respect to a first axis, and a base wall that extends with respect to a second axis that is perpendicular to the first axis and extends with respect to a third axis that is perpendicular to the first axis and perpendicular to the second axis, wherein the drain is sloped with respect to the third axis so that the water drains to the drain under force of gravity;
wherein the muffler outlet is spaced apart from the base wall and the muffler inlet is located between the muffler outlet and the drain with respect to the first axis; and
wherein the muffler inlet extends through one of the sidewalls and directs the exhaust gases into the interior.

4. The marine drive according to claim 3, wherein the muffler inlet is oriented towards a corner of the idle relief muffler.

5. The marine drive according to claim 3, wherein the muffler inlet directs the exhaust gases away from the drain with respect to the second axis.

6. The marine drive according to claim 5, wherein the base wall and sidewalls are transverse to each other such that a corner is defined between the base wall and sidewalls, and wherein the muffler inlet is directed towards a corner that is spaced apart from the drain with respect to the second axis.

7. The marine drive according to claim 6, wherein the base wall is sloped so that the water in the interior drains by gravity from the corner to the drain.

8. The marine drive according to claim 7, wherein the muffler inlet has an inlet grommet that extends into the interior of the idle relief muffler, the inlet grommet having a deflector surface located in the interior of the idle relief muffler, the deflector surface configured to redirect the exhaust gases from the exhaust conduit in a direction that is oriented away from the muffler outlet with respect to the vertical direction and away from the drain with respect to the second axis.

9. An idle relief muffler for a marine drive, the idle relief muffler comprising:
an interior defined by sidewalls that extend with respect to a first axis and a base wall that extends with respect to a second axis that is perpendicular to the first axis and extends with respect to a third axis that is perpendicular to the first axis and perpendicular to the second axis;
a drain for draining water from the idle relief muffler;
a muffler inlet formed in one of the sidewalls and spaced apart from the drain with respect to the first axis, the muffler inlet being configured to convey exhaust gases from an engine of the marine drive to the interior of the idle relief muffler; and
a muffler outlet spaced apart from the muffler inlet with respect to the first axis, the muffler outlet being configured to discharge the exhaust gases from the interior of the idle relief muffler;
wherein the muffler inlet conveys exhaust gases into the idle relief muffler in a direction that is oriented away from the muffler outlet and away from the drain, such that water in the exhaust gases is encouraged to separate from the exhaust gases and then drain from the idle relief muffler via the drain; and
wherein the muffler inlet has an inlet grommet that extends into the interior of the idle relief muffler, the inlet grommet having a deflector surface located in the interior of the idle relief muffler, the deflector surface configured to redirect the exhaust gases from the exhaust conduit in a direction that is oriented away from the muffler outlet with respect to the first axis and away from the drain with respect to the second axis.

10. The marine drive according to claim 9, wherein the muffler inlet directs the exhaust gases into the interior of the idle relief muffler and away from the drain with respect to the second axis.

11. A marine drive comprising:
an engine;
an exhaust conduit that conveys exhaust gases from the engine to an idle relief outlet on the marine drive, wherein the idle relief outlet discharges the exhaust gases to atmosphere when the marine drive is operated at an idle speed; and an idle relief muffler having a muffler inlet that receives the exhaust gases from the exhaust conduit, a muffler outlet that discharges the exhaust gases to the idle relief exhaust outlet, and a drain for drawing water from the idle relief muffler, wherein the muffler inlet conveys exhaust gases into the idle relief muffler in a direction that is oriented away from the muffler outlet and away from the drain, such that water in the exhaust gases is encouraged to separate from the exhaust gases and then drain from the idle relief muffler via the drain;

wherein the muffler inlet directs the exhaust gases into the interior of the idle relief muffler and away from the drain with respect to the second axis; and wherein the base wall and sidewalls are transverse to each other such that a corner is defined between the base wall and sidewalls, and wherein the muffler inlet is directed towards the corner away from the location of the drain with respect to the second axis, and wherein the base wall is sloped so that the water in the interior drains by gravity from the corner to the drain.

12. The marine drive according to claim 11, wherein the muffler inlet has an inlet grommet that extends into the interior of the idle relief muffler, the inlet grommet having a deflector surface located in the interior of the idle relief muffler, the deflector surface configured to redirect the exhaust gases from the exhaust conduit in a direction that is oriented away from the muffler outlet with respect to the first axis and away from the drain with respect to the second axis.

* * * * *